United States Patent [19]

Takahashi et al.

[11] Patent Number: 4,716,719
[45] Date of Patent: Jan. 5, 1988

[54] METHOD OF AND APPARATUS FOR CONTROLLING FUEL OF GAS TURBINE

[75] Inventors: Koji Takahashi; Tsunemasa Nishijima; Seisaku Takihana, all of Hitachi, Japan

[73] Assignee: Hitachi, Ltd., Tokyo, Japan

[21] Appl. No.: 852,820

[22] Filed: Apr. 16, 1986

[30] Foreign Application Priority Data

Apr. 17, 1985 [JP] Japan .................................. 60-80186

[51] Int. Cl.$^4$ ............................................... F02C 9/28
[52] U.S. Cl. ................................. 60/39.06; 60/39.281; 60/747
[58] Field of Search ............... 60/39.03, 39.06, 39.281, 60/733, 746, 747, 39.465

[56] References Cited

U.S. PATENT DOCUMENTS

| 3,078,046 | 2/1963 | Tyler. | |
|---|---|---|---|
| 3,552,123 | 1/1971 | Anschutz et al. | 60/746 |
| 3,925,002 | 12/1975 | Verdouw | 60/746 |
| 4,291,532 | 9/1981 | Robinson | 60/39.06 |
| 4,292,801 | 10/1981 | Wilkes et al. | 60/39.06 |
| 4,420,929 | 12/1983 | Jorgensen et al. | 60/39.06 |
| 4,470,257 | 9/1984 | Wescott. | |
| 4,498,288 | 2/1985 | Vogt | 60/39.06 |
| 4,603,548 | 8/1986 | Ishibashi et al. | 60/39.06 |

OTHER PUBLICATIONS

Transactions of the ASME, Journal of Engineering for Gas Turbines and Power, vol. 106, Oct. 1984, pp. 795-800, N.Y., K. Aoyama et al.: "Development of a Dry Low NOx Combustor for a 120-MW Gas Turbine".

Primary Examiner—Louis J. Casaregola
Attorney, Agent, or Firm—Antonelli, Terry & Wands

[57] ABSTRACT

A method of controlling fuel of a gas turbine provided with a two-stage combustion type combustor wherein the fuel of gas is fed to the combustor only through a primary fuel nozzle under a low-run of the gas turbine and through the both the primary fuel nozzle and a secondary fuel nozzle under a high-run of the gas turbine, and controlled by a fuel control valve according to a load signal, comprises measuring the flow rate of the fuel passing through the fuel control valve; controlling the fuel control valve according to the measured flow rate so that the flow rate will be constant or a scheduled value when the gas turbine reaches to a predetermined load; and switching fuel supply to the combustor from the primary fuel nozzle to through both the primary and secondary fuel nozzles while the fuel control valve is controlled according to the measured flow rate signal.

11 Claims, 4 Drawing Figures

METHOD OF AND APPARATUS FOR CONTROLLING FUEL OF GAS TURBINE

BACKGROUND OF THE INVENTION

The present invention relates to a method and apparatus for controlling the fuel gas of a gas turbine and, more particularly, to a fuel gas controlling method and apparatus for controlling the fuel supply to a two-stage combustion type gas turbine combustor through only a primary fuel nozzle during a low-load run and through not only the primary fuel nozzle but also a secondary fuel nozzle during a high-load run.

A so-called two-stage combustion type gas turbine combustor is well known, wherein a primary fuel nozzle is arranged upstream of the combustor, whereas, a secondary fuel nozzle is arranged downstream of the combustor so that the gas turbine may be run only by the primary fuel nozzle during a low-load run at a low fuel gas flow rate and by supplying the fuel gas to the secondary fuel nozzle, too, during a high-load run. An example of such a combustor is described in "Development of a Dry Low NOx Combustor for a 120 MW Gas Turbine," ASME Paper No. 84-GT-44.

In a two-stage combustion system of the prior art, a fuel gas has a pressure thereof controlled to a constant level by a fuel gas pressure-regulating valve and then has a flow rate thereof controlled in accordance with a load control signal by a fuel control valve until the fuel gas is introduced into primary fuel nozzles of a plurality of combustors. On the other hand, the fuel gas having passed through a fuel line, branched from the downstream of the fuel control valve and through a fuel switching valve provided on the branched fuel line, is introduced through a gas manifold into a secondary fuel nozzle.

The fuel switching valve is responsive to a load signal of the gas turbine and is set to be shifted upon reaching predetermined load, from its fully closed position to its fully open position for a short period of time in response to a switching signal from a switch control unit.

In this system, the fuel gas flow rate is always exclusively controlled by the load control signal. With a low turbine load, the turbine is exclusively operated with the primary fuel of the primary fuel nozzle. For the time period required for a fuel line switching operation, the fuel supply is switched so that the fuel gas is supplied to the combustor in parallel from the primary and secondary fuel nozzles. Namely, for short period of time of the fuel switching operation, the turbine is operated in parallel by the primary and secondary fuel nozzles, and after that, the turbine is operated in parallel by the primary and secondary fuel nozzles according to a load schedule.

In this system, the operation is exclusively carried out by the primary fuel in the low-load range and, during and after the operation under a predetermined load, the two-stage combustion is required for reducing the emission of NOx so that the combustion is shifted to the two-stage combustion by additionally injecting the fuel from the secondary fuel nozzle. As mentioned above, during this switching operation, the load is controlled to maintain a constant level, and the total resultant fuel gas amount must be held at a constant level. In this state, the load control signal is held for the switching period, and the switching valve is opened. However, when the fuel gas is supplied to the secondary fuel line, the combustion gas may flow back from the combustor to the secondary fuel line to cause a backfiring. The switching valve has to be instantly shifted from its closed position to an open position to ignite a secondary fuel. At this instant, the orifice area of the nozzle is switched to flow at a flow rate from primary fuel to the sum of primary fuel and secondary fuel so that the flow rate of the fuel gas through the line increases to instantly drop the pressure at the outlet of the fuel control valve. Since the fuel control valve is under the control of the load signal, the load is instantly augmented if the increase in the gas flow rate abruptly occurs in the state of the constant load. Then, the fuel control valve operates in a closing direction thereof so as to maintain a constant load. However, due to the delay of the load signal, the total amount of the fuel gas supplied is temporarily increased to cause a load fluctuation. This is because the temperature of the combustion gas is instantly increased so that the temperature increase is sensed as the increase in the gas turbine output, i.e., as the load control signal. By these transient phenomena, the large load fluctuations, that is, the combustion gas temperature fluctuations are caused in the existing system during the switching operation, although they are very undesired for controlling the operation of the gas turbine and for the service time of the hot parts. In case the aforementioned fluctuations are remarkable, moreover, the hot parts may possibly be broken, and a highly responsive control method is accordingly required.

SUMMARY OF THE INVENTION

An object of the present invention resides in providing a fuel control method and an apparatus to be used with a two-stage combustion type gas turbine combustor equipped with primary and secondary fuel nozzles, which are free from the above-mentioned problems and are able to improve the load control and the service time of the hot parts by suppressing the load fluctuations occurring during a switching operation of the fuel lines.

In accordance with the present invention, the flow rate of a fuel gas fed to a two-stage combustion type gas turbine combustor with primary and secondary fuel nozzles is controlled according to a load control signal during a normal operation of a gas turbine and is independently controlled with respect to the load control signal and in dependence upon a fuel flow rate measured at the start of a switching operation of fuel supply to the combustor from through the primary fuel nozzle to through the primary and secondary fuel nozzles so that the measured fuel flow rate is constant or of a scheduled function of time for the time period required for the switching operation.

The normal operation of the turbine means the operation of the turbine except for the period of time of the fuel switching operation including a stabilization period.

According to a feature of the present invention, the flow rate of the fuel gas fed to the combustor is controlled by a fuel control valve provided on a fuel line from which primary and secondary fuel lines are branched for respectively conveying the fuel to the primary fuel nozzle and the secondary fuel nozzle.

DESCRIPTION OF THE PREFERRED EMBODIMENTS

As mentioned above, if a fuel control valve is exclusively controlled by a load control or command signal when the fuel supply to a two-stage combustion type gas turbine combustor is switched from the fuel supply by a primary fuel nozzle to the fuel supply by both the primary fuel nozzle and a secondary fuel nozzle, the total flow rate of a fuel fed to the combustor fluctuates because of a large control delay, thus fluctuating the load. The present invention carries out the fuel supply switching operation while suppressing the load fluctuations by controlling the fuel control valve directly with the fuel flow rate for a period of time required for the fuel supply switching operation.

Figure 1:
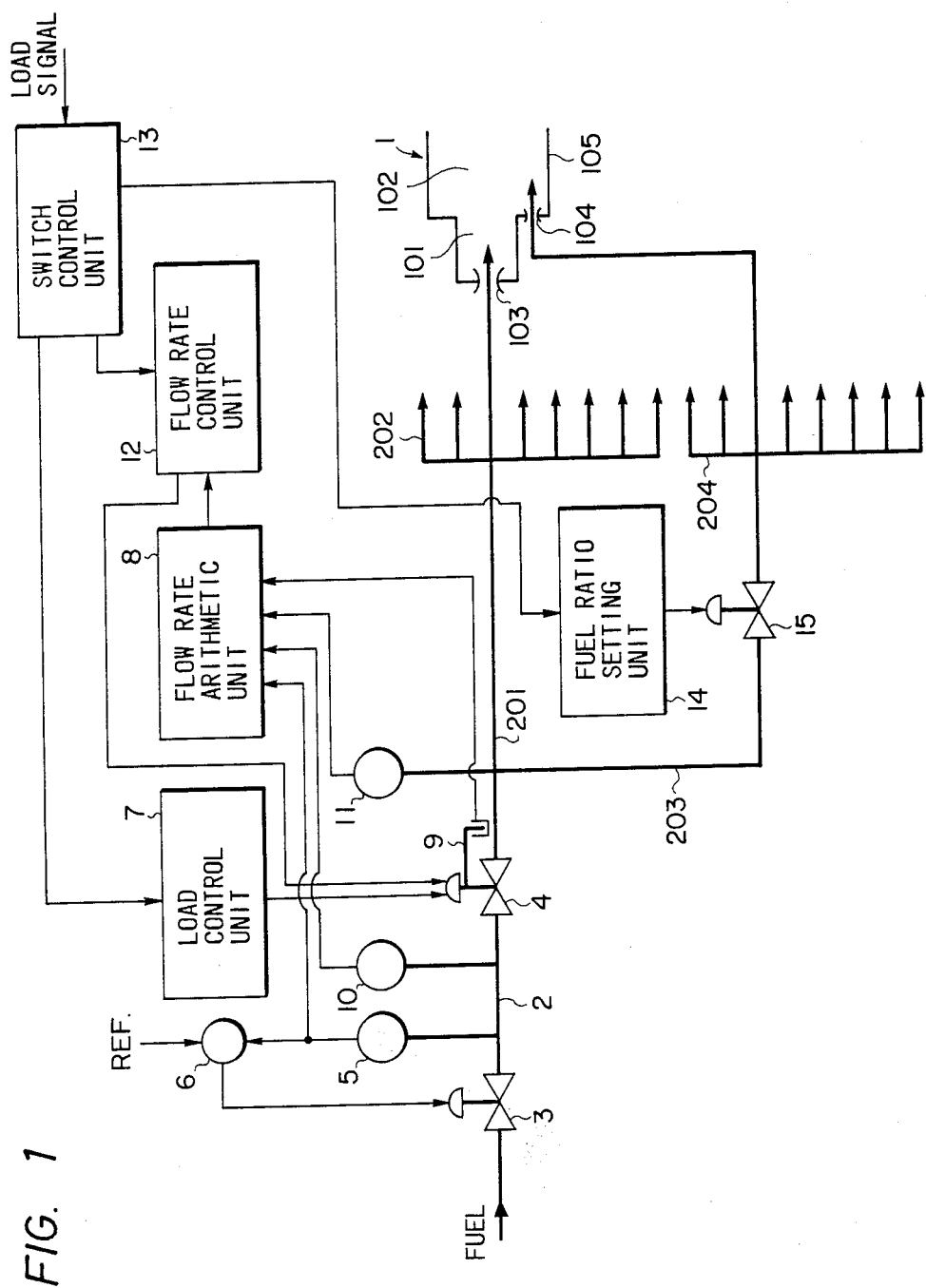
FIG. 1 is a schematic view of an embodiment of an apparatus for controlling a fuel gas fed to a two-stage combustion type gas turbine combustor according to the present invention.

Referring now to the drawings wherein like reference numerals are used throughout the various views to designate like parts and, more particularly to FIG. 1, according to this figure, a two-stage combustion type gas turbine combustor generally designated by the reference numeral 1 comprises a primary combustion zone 101 and a secondary combustion zone 102 positioned downstream of the primary combustion zone 101. The combustor 1 is provided with a gas primary fuel nozzle 103 for injecting a fuel into the primary combustion zone 101 and a secondary fuel nozzle 104 for injecting a gas fuel into the secondary combustion zone 102. Compressed air, necessary for combustion of the fuel, is fed to the primary and secondary combustion zones 101, 102 through holes (not shown) formed in a casing 105 defining the combustion zones 101, 102.

The primary and secondary fuel nozzles 103, 104 are fluidly connected to a fuel line 2 through a primary fuel line 201 with a manifold 202 and a secondary fuel line 203 with a manifold 204, respectively. The primary and secondary fuel lines 201, 203 are branched from the fuel line 1 downstream of a fuel control valve 4. The primary and secondary manifolds 202, 204 each have respective branch lines. The number of the branch lines of the manifolds 202, 204 corresponds to the number of combustors 1, namely, an example of a gas turbine is provided with about ten combustors each of which is connected to the branch lines of each of the manifolds 202, 204.

The fuel line 2 is provided with a pressure-regulating valve 3 and the fuel control valve 4, with the pressure-regulating valve 3 regulating the pressure of the fuel in the fuel line 2 to a predetermined pressure by pressure regulating valve control means 6. The pressure-regulating valve control means 6 controls the pressure regulating valve 3 in such a manner that the pressure of the fuel in the fuel line 2 downstream of the pressure-regulating valve 3, which is detected by a pressure sensor 5, is received as a signal related to the detected pressure, the detected pressure is compared with the reference pressure to generate a signal related to the pressure difference between the detected pressure and the reference pressure, and the pressure regulating valve 3 is controlled in accordance with the generated signal so that the pressure difference will be zero. By virtue of the control, a predetermined regulated pressure is obtained. The regulated predetermined pressure also can be attained by a conventional pressure regulator.

The fuel control valve 4 controls the flow rate of fuel in the fuel line 2, according to a load command signal from a load control unit 7 so as to attain a required turbine load during the ordinary turbine operation.

The flow rate of the fuel passing through the fuel control valve 4 is indirectly expressed by using the following relationship:

$$Q = f(P_1, P_2, T_1, S),$$

wherein:

$P_1$: an inlet pressure of the fuel control valve 4;
$P_2$: an outlet pressure of the fuel control valve 4;
$T_1$: an inlet temperature of the fuel control valve 4; and
$S$: a stroke of the fuel control valve 4.

The values of $P_1$, $P_2$, $T_1$ and $S$ are detected by the pressure sensor 5 disposed upstream of the fuel control valve 4, a pressure sensor 11 downstream of the fuel control valve 4, a temperature sensor 10 and a stroke detector 9 of the fuel control valve 4 which detects the stroke related to the opening of the valve 4, respectively. The flow rate of the fuel flowing through the fuel control valve 4 is calculated at all times by a flow rate arithmetic unit 8 for generating and delivering a signal related to the resultant flow rate to a flow rate control unit 12. The flow rate control unit 12 is constructed so as to control the fuel control valve 4 when a switching instruction is supplied so that the flow rate at the time when the instruction is supplied is taken as a reference, successively detected flow rate is compared with the reference, and the resultant pressure difference is made zero through the actuation of the fuel control valve 4. The switching instruction is supplied by a switch control unit 13. The switch control unit 13 receives a load control signal for operating the gas turbine along a load schedule, and deliveres the control signal to the load control unit 7 during the ordinary operation, and generates switching instructions when the turbine reaches to a predetermined value such as, for example, 30% of the full turbine load. One of the switching instructions is supplied to the flow rate control unit 12 prior to the load signal to operate the flow rate control unit 12 in the above-mentioned manner, and the other is supplied to a switching valve 15 to open the valve 15 through a fuel ratio setting unit 14. When the load on the turbine reaches the predetermined level, the switch control unit 13 instructs the switching valve 15 to open and switches the control system so that the fuel control valve 4 may be controlled in response to the signal from the flow rate control unit 12 prior to the load control signal. After a predetermined time period has elapsed, the switch control unit 13 returns the fuel control valve 4 to a control by the load control signal. The fuel ratio setting unit 14 is for setting an opening of the switching valve 15 so that a ratio between a flow rate of the fuel flowing in the primary fuel line 201 and a flow rate of the fuel flowing in the secondary fuel line 202 becomes a predetermined value. An example of the fuel ratio setting unit includes a means for limiting an opening of the switching valve 15. The secondary fuel nozzle 104 has a total flow resistance which is smaller than that of the primary fuel nozzle 103, so that the opening of the switching valve 15 can determine the fuel ratio. Therefore, a signal from the fuel ratio setting unit 14 becomes a fuel ratio signal.

Figure 2:
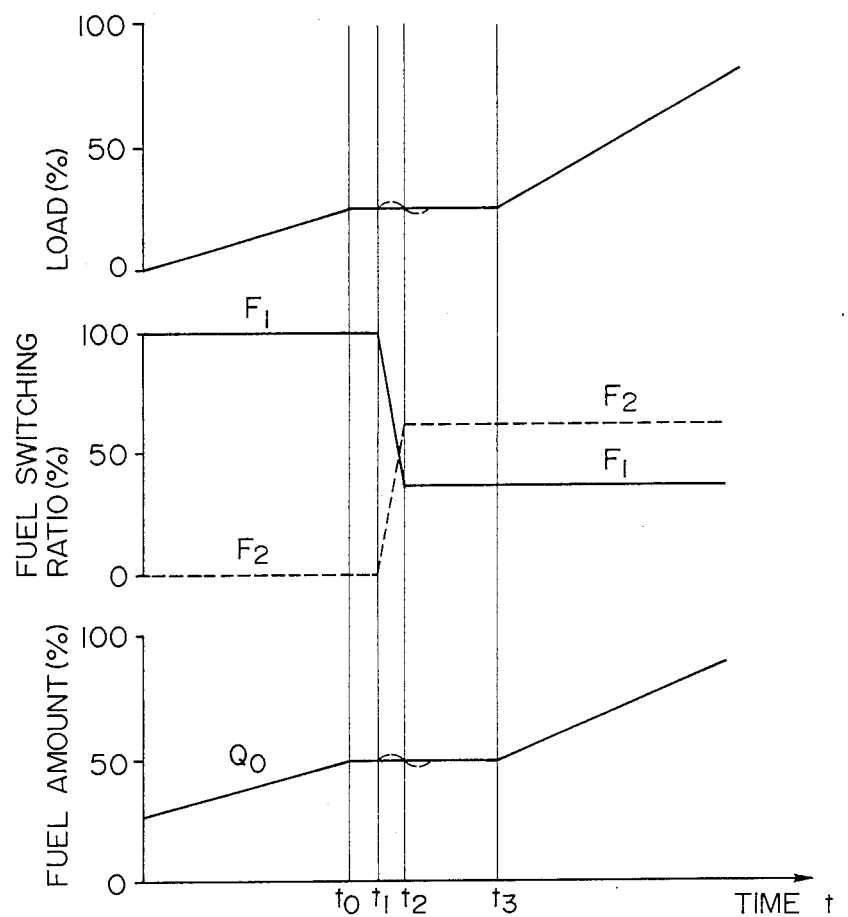
FIGS. 2 and 3 are graphical illustration respectively showing relationships between time and load; time and fuel switching ratio; and time and a fuel amount.

In FIG. 2, the gas turbine is controlled by the load control unit 7 receiving a load signal to operate along a load schedule as shown in FIG. 2 until the the time period $t_0$, that is, the time period that the gas turbine reaches to a predetermined load, for example, 30% of the full load of the turbine. At the time period $t_0$, the fuel switching command is generated by the switch control unit 13 having received the load signal related to the predetermined load. The flow rate of fuel passing through the fuel control valve 4 is computed by the flow rate arithmetic unit 8 in accordance with the signals indicating the inlet pressure $P_1$, the inlet temperature $T_1$ and the outlet pressure $P_2$ of the fuel control valve 4, and the stroke S of the fuel control valve 4 at the time period $t_0$, and is instructed as the opening control signal of the flow rate control unit 12 to the fuel control valve 4 so that the flow rate may be controlled to a constant level for a fuel line switching time period $t_0$ to $t_3$ of, for example, one min. At the time period $t_1$, that is, a little later than the time period $t_0$, the switching valve 15 is instantly opened in accordance with the fuel ratio signal from the fuel ratio setting unit 14 and is completely shifted to have a predetermined opening at the time period $t_2$. Namely, the flow rate of the fuel $F_2$ is fed to the secondary combustion zone 102 through the secondary fuel nozzles 104 by opening the switching valve 15, in a time period $t_1$ to $t_2$ of, for example, from 0 to about 65% of the total flow rate of the fuel fed to the combustor 1. The fuel $F_2$ reduces the flow rate of the fuel $F_1$ fed to the primary combustion zone 101 through the primary fuel nozzle 103 of, for example, 100 to about 35% of the total flow rate for the same time period $t_1$ to $t_2$. The total flow rate of the tuel to the combustor 1 is kept constant $Q_0$ for the fuel line switching operation period $t_0$ to $t_3$ including a stabilization time period $t_2$ to $t_3$. After this switching operation including the stability time period, the control is switched to the load control at the time period $t_3$ to increase the load according to the load schedule.

According to the control system of FIG. 1, the flow rate of the gas through the fuel control valve 4 is measured and is controlled to take the constant value $Q_0$. Therefore, the system can be made highly responsive if the sensors are highly responsive. As a result, even if the switching valve 15 is abruptly opened to drop the pressure $P_2$, the opening of the fuel control valve 4 can be instantly dropped to minimize the fluctuations of the flow rate.

According to the present system, the fluctuations of the total fuel flow rate can be suppressed to about one-tenth that of the prior art, as depicted by broken lines in FIG. 2.

Figure 3:
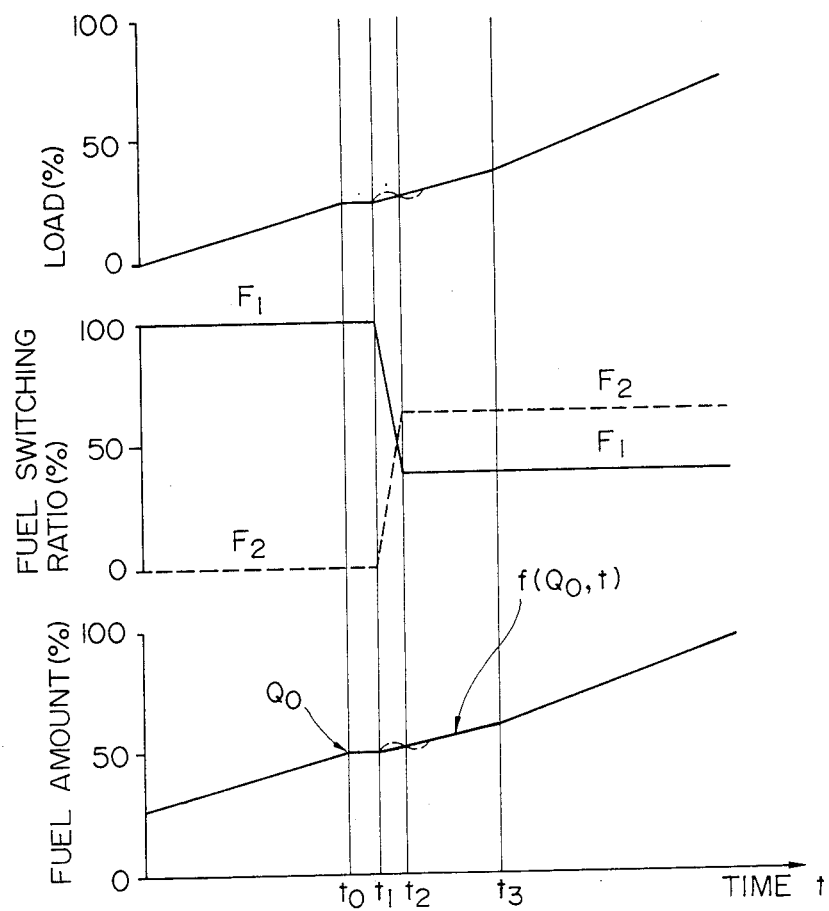

In FIG. 1, the total fuel flow rate is held constant for the fuel system switching time period $t_0$ to $t_3$, but the target value can be set to change as a function of the time for the switching period, as shown in FIG. 3.

In case it is intended to gradually increase the load even for the switching time period, more specifically, it is sufficient that the target value be given as a function of both the flow rate $Q_0$ at the beginning of the switching operation and the lapse time period t from the start of the switching operation, and that the flow rates measured at the individual instants be controlled to conform to the target values. The characteristics for the switching operation are depicted in FIG. 3. In this case, that control can be easily realized by giving the target values, which are to be imposed upon the flow rate control unit 12, as the function of time.

Figure 4:
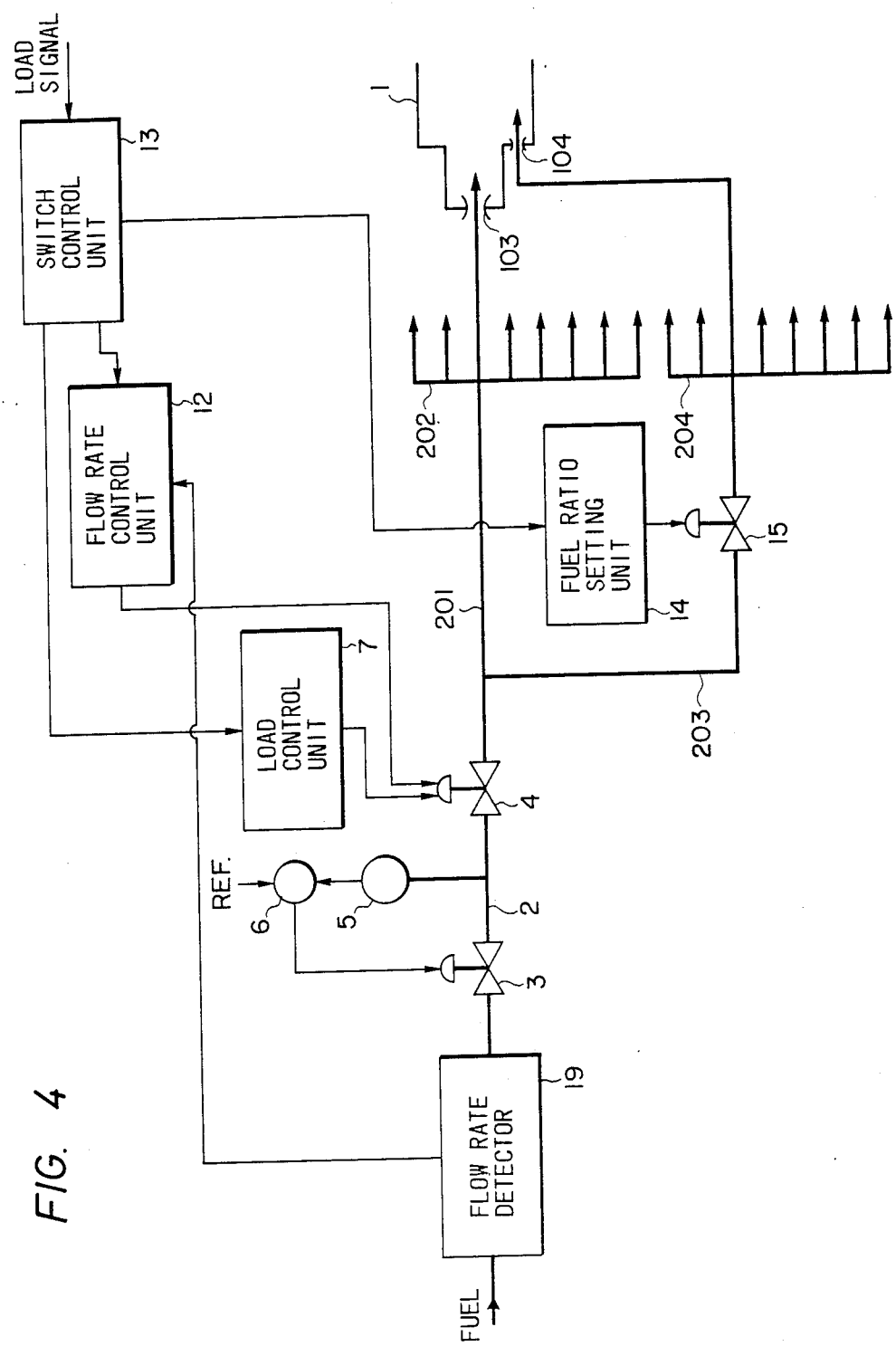
FIG. 4 is a schematic view illustrating another embodiment of an apparatus for controlling a fuel gas fed to a two-stage combustion type gas turbine combustor according to the present invention.

FIG. 4 shows another embodiment in which the fuel flow rate is measured directly by a flow meter detector 19. The embodiment of FIG. 4 can enjoy a merit that the actual flow rate can be directly determined. The other construction is the same as one shown in FIG. 1.

As apparent from the above description, according to the present invention, the fluctuations of the total gas flow rate of the two-stage combustion type fuel line as a result of the switching operation of the fuel gas nozzles can be suppressed to suppress the load fluctuations and the consumption of the service time of the hot parts as much as possible.

What is claimed is:

1. A method of controlling a fuel gas to be fed to a gas turbine provided with a combustor having primary and secondary fuel nozzles supplying the fuel gas into said combustor the method comprising the steps of supplying the fuel gas into said combustor only through said primary fuel nozzle while cotrolling said gas turbine in accordance with a load control signal to operate on a load schedule of said gas turbine during a low load operation of said gas turbine, supplying the fuel gas into said gas turbine through both said primary and secondary fuel nozzles while controlling said gas turbine in accordance with said load control signal to operate on said load schedule during a high load operation of said gas turbine, measuring the flow rate of the fuel gas flowing to said gas turbine, and controlling said fuel flow to said gas turbine, based on a measured flow rate, so that the flow rate of said fuel flow to said gas turbine will be a value measured at a starting of a changing operation of the fuel supply to said gas turbine from only through said primary fuel nozzle to through both said primary and secondary fuel nozzles and maintained at a scheduled value during said fuel supply changing operation.

2. The method according to claim 1, wherein said step of controlling the fuel flow to said gas turbine is conducted by controlling a fuel control valve provided on a fuel line for conveying the fuel gas to said combustor, in accordance with a signal related to the flow rate measured in said measuring step, said fuel line being divided into two fuel lines, wherein one of said fuel lines leads to said primary fuel nozzle, and the other fuel line leads to said secondary fuel nozzle.

3. The method according to claim 2, further comprising the step of calculating said flow rate of the fuel flowing through said fuel control valve in dependence upon a difference between pressures upstream and downstream of said fuel control valve, a temperature of said fuel gas, and an opening of said fuel control valve.

4. The method according to claim 2, wherein said fuel flow rate is held at the same level as that measured at a start of the fuel supply changing operation for said predetermined time period.

5. The method according to claim 1, comprising a fuel supply to said secondary fuel nozzle when the load upon said gas turbine reaches a predetermined level, and holding the measured value of said fuel flow rate during said fuel supply changing operation.

6. The method according to claim 2, wherein the flow rate of the fuel flowing through said fuel control valve is controlled along the scheduled fuel flow rate in which the flow rate increases during a time lapse after the start of the fuel supply to said secondary fuel nozzle in said predetermined time period.

7. A method of controlling the fuel gas fed to a gas turbine provided with a two stage combustion type combustor having a primary fuel nozzle for supplying a fuel gas into a primary combustion zone of said combustor and a secondary fuel nozzle for supplying a fuel gas into a secondary combustion zone of said combustor, which method comprises the steps of:

supplying a fuel gas into said combustor only through said primary fuel nozzle through a fuel control valve while controlling said fuel control valve according to a load control signal to run said gas turbine under a load schedule during a low load run;

measuring the flow rate of the fuel gas fed to the combustor through the fuel control valve to generate a signal related to the measured flow rate value;

generating switching instruction signals when the turbine reaches to a predetermined load;

controlling the flow rate of the fuel gas flowing into the combustor by taking, as a reference flow rate, the measured flow rate at the time when the predetermined load is reached, comparing the successively measured fuel flow rate in the measuring step with the reference flow rate and actuating the fuel control valve so that a difference between the reference flow rate and the successively measured fuel flow rate will be a scheduled value;

switching fuel supply to the combustor from only through the primary fuel nozzle to through both the primary and secondary fuel nozzles in the period of time for which the flow rate of the fuel gas is controlled, based on the measured flow rate of the fuel gas; and controlling the flow rate of the fuel gas fed to the combustor according to the load control signal after termination of the fuel supply switching so as to run the turbine along the load schedule.

8. The method according to claim 7, wherein said scheduled value of the flow rate is constant.

9. The method according to claim 7, wherein the scheduled value of the flow rate increases linearly with the time lapsed.

10. A method of controlling fuel gas fed to a gas turbine provided with a two stage combustion type combustor having a primary fuel nozzle for supplying a fuel gas to a primary combustion zone of said combustor, a secondary fuel nozzle for supplying a fuel gas into a secondary combustion zone of said combustor, and a fuel control valve provided on a fuel line from which primary and secondary fuel lines branch off downstream of said fuel control valve, said primary fuel line leading to said primary fuel nozzles and said second fuel line to said secondary fuel nozzles, the method comprising the steps of:

supplying a fuel gas into said combustor only through said primary fuel nozzle through said fuel control valve while controlling said fuel control valve in accordance with a load control signal so as to operate said gas turbine under a load schedule during a low load operation;

measuring a flow rate of the fuel gas to the combustor through said fuel control valve to generate a signal related to the measured flow rate value;

generating switching instruction signals when said turbine reaches a predetermined load;

controlling the flow rate of the fuel gas to said combustor by taking, as a reference flow rate, a measured flow rate at a time when the predetermined load is reached, comparing successively measured fuel flow rates in the measuring step with the reference flow rate and actuating said fuel control valve so that a difference between the reference flow rate and the successively measured fuel flow rates is a scheduled value;

switching fuel supply to said combustor from only through said primary fuel nozzle to both said primary and secondary fuel nozzles by controlling a switching valve provided on said secondary fuel line so that a ratio between a flow rate of fuel gas in said primary fuel line and a flow rate of fuel gas in said secondary fuel line will be a predetermined value while controlling said fuel control valve based on said measured flow rate; and controlling the flow rate of the fuel gas to said combustor according to the low control signal after a termination of the fuel supply switching so as to operate said turbine on the load schedule.

11. The method according to claim 10, wherein said scheduled value of the flow rate is substantially zero.

* * * * *